Dec. 11, 1934.                R. ABELL                1,984,297
                        ENGINE DRIVE MECHANISM
              Filed Oct. 22, 1931           2 Sheets-Sheet 1

Inventor:
Rollin Abell.
by
Charles L. Gooding
Atty.

Dec. 11, 1934.   R. ABELL   1,984,297
ENGINE DRIVE MECHANISM
Filed Oct. 22, 1931   2 Sheets-Sheet 2

Inventor:
Robbin Abell.
by Charles L. Gooding,
Att'y.

Patented Dec. 11, 1934

1,984,297

UNITED STATES PATENT OFFICE 1,984,297

ENGINE DRIVE MECHANISM

Rollin Abell, Milton, Mass.

Application October 22, 1931, Serial No. 570,297

18 Claims. (Cl. 74—9)

This invention relates to an engine drive mechanism particularly adapted to transmit motion from a driving shaft to a driven shaft such, for example, as the driving shaft of a starting motor of an automobile and the flywheel and crank shaft of an internal combustion engine.

The object of the invention is to provide a mechanism which will increase the life of the pinion of the starting motor and the ring gear which is fastened to the flywheel of the internal combustion engine by preventing the chipping of the teeth of both the pinion and ring gear during the interengagement of the teeth of the pinion with the teeth of the gear and to reduce the shock of the starting motor while starting the engine, and to accomplish this object the engine drive mechanism of this invention embodies therein a helical torsion shock-absorbing spring which also functions as a clutch member, said spring being interposed between the pinion or driven member and a cam member which constitutes a driving member and which is driven by the starting motor shaft, thus protecting the spring from breakage on overloads such as backfires, etc.

Another object of the invention is to provide a type of helical torsional shock-absorbing spring which will be free from projecting end portions of any form which might break off and fall into the flywheel and clutch housing and cause injury to the mechanism contained therein.

Another object of the invention is to provide a type of starter motor spring which cannot become permanently distorted by overloads or backfire.

The invention consists in an engine drive mechanism of the character set forth in the following specification and particularly pointed out in the claims.

Referring to the drawings:—

Like numerals refer to like parts throughout the several views of the drawings.

Figure 1:
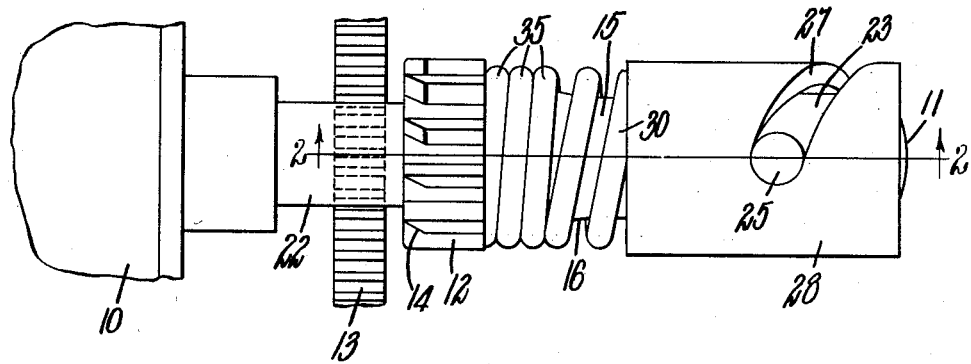
Fig. 1 is a side elevation of an engine drive mechanism embodying my invention, portions of the same being broken away.

In the drawings, referring to Figs. 1 to 5 inclusive, 10 is a portion of a starting motor such as is used in automobiles for starting the rotation of the engine crank shaft and well known to those skilled in the art and 11 is the starting motor shaft. 12 is a pinion which is slidably mounted in relation to the shaft 11 and is operated by mechanism hereinafter described to be moved longitudinally of the shaft 11 into engagement with an annular gear 13 which is positioned upon a flywheel not shown in the drawings. The pinion 12 may have its teeth chamfered at 14 in order to assist in the interengagement of the pinion teeth with the gear teeth and has a hub 15 formed integral therewith. An intermediate portion of the hub 15 is reduced in diameter at 16 and an annular groove 17 extends around the hub 15 at the point where the hub joins the pinion. An end portion 18 of the hub 15 is provided for the purpose of positioning a portion of the starter mechanism with relation to the pinion 12 for purposes to be hereinafter explained in detail.

The interior of the pinion is recessed to provide a chamber 19 which extends around the starting motor shaft 11. A spiral spring 20 is positioned within the chamber 19 and encircles the shaft 11, and one end of said spring bears against a shoulder 21 which forms the end wall of the chamber 19, while the other end of said spring bears against the extremity of a sleeve 22 which surrounds the shaft 11 and projects a sufficient distance into the chamber 19 to provide a bearing for one end of the pinion 12.

Rigidly secured to the outer portion of the shaft 11 is a sleeve 23 which is secured to the shaft by means of a pin 24, the latter having a head portion 25 formed integral therewith at one end thereof and a sleeve 26 rigidly secured thereto at the other end thereof, said head and sleeve being of the same diameter and projecting into cam slots 27 formed in a cam member 28. The cam member 28 encircles the sleeve 23 and end portion 18 of the hub 15 of the pinion 12 and the internal bore of said cam member 28 is spaced a predetermined distance apart from the periphery of the sleeve 23. The internal bore of the cam member 28 is increased in diameter at 29 to form a seat for a helical torsional shock-absorbing spring 30, wound left hand, and an annular groove 31 is also provided upon the interior of the cam member to receive an end convolution of said spring.

A tapered portion 32 is provided at one end of the cam member 28 to facilitate the assembly of the spring 30 with said cam member. The spring 30 before assembly is preferably frusto-conical in form and has a plurality of intermediate convolutions which are spaced apart. Several convolutions 33 of the spring at its large end are flattened at 34 and these convolutions are contracted and forced into the enlarged bore 29 of the cam member 28 and when in position frictionally engage said bore with a driving capacity of at least as much as the stall torque of the starting motor 10 and the end convolution springs into interlocking engagement with the groove 31 and acts to hold the spring in the cam member. The end convolutions 33, furthermore, of the spring 30 when in position within the cam member 28 surround the end portion 18 of the pinion 12 and it is desirable that there shall be a slight clearance between the periphery of the portion 18 and the adjacent surface of the spring. The portion 18 of the hub acts to maintain the alignment of the cam with the shaft through the medium of the spring. The small end of the spring 30 is attached to the hub portion 15 of the pinion 12, several convolutions 35 of said spring at said small end being expanded and frictionally engaging the periphery of said hub, and it is desirable that the end convolution shall be so formed that it will spring into the groove 17 in a manner to hold the end of the spring firmly upon the hub of the pinion. It is desirable that the convolutions 35 of the spring 30 shall engage the periphery of the hub 15 with sufficient friction to carry a load equal to or exceeding the stall torque of the starting motor. The convolutions 35, furthermore, have a wrapping or self-tightening action around the hub 15 when the spring is rotated and cannot slip in the direction of the drive. The hub 15 can slip, however, if driven in a reverse direction, but this can never occur as there is no reverse action excepting to demesh the pinion from the gear.

The general operation of the mechanism hereinbefore specifically described is as follows:— When the starter motor 10 is started in operation, the shaft 11 upon being rotated will drive the sleeve 23 and pin 24, and the head 25 at one end of the pin and sleeve 26 at the other end of said pin will engage the surface of the cam slots 27 in such a manner that the cam member 28 will be forced longitudinally of the shaft 11 carrying with it the spring 30 and pinion 12 until the pinion 12 engages the annular gear 13. The pin 24 furthermore imparts a rotary motion to the cam member 28 and through the torsion spring 30 a rotary motion is imparted to the pinion 12. When the pinion 12 engages the gear 13, if the teeth of the pinion and the gear abut, the teeth of the pinion will be pressed against the teeth of the gear and the torsional spring 30 will yield lengthwise, thus providing a time lag in the rotation of the pinion and allowing the shaft 11 to continue its rotary motion while the teeth of the pinion have time to work their way into mesh with the teeth of the gear without chipping or breaking either the teeth of the pinion or of the gear. If the resistance of the teeth on the pinion to rotation, when said teeth first abut against the teeth of the gear, is excessive, the convolutions 33 of the spring 30 which have frictional engagement with the bore 29 of the cam member 28 will slip and this will prevent breaking of the torsional spring. The pinion 12 thus has opportunity to move on the teeth of the gear 13 until they come into alignment with the space between the gear teeth, whereupon the pinion will move forward until its teeth mesh with with the gear teeth. At this time the drive through the torsional spring 30 will begin again a second time, and at this second time the torsion spring will act and the convolutions 33 thereof will slip within the cam member 28 until the inertia of the flywheel and engine is overcome, so that there are two possible points at which the spring will slip within the cam member, namely, when the teeth of the pinion first abut against the teeth of the gear, and second, after the teeth of the pinion have moved into mesh with the teeth of the gear. In any case, the torsion spring will act twice unless it happens that the pinion teeth align with the space between the teeth of the gear, whereupon no resistance to the forward movement of the pinion to bring it into mesh with the gear will be encountered.

Figure 2:
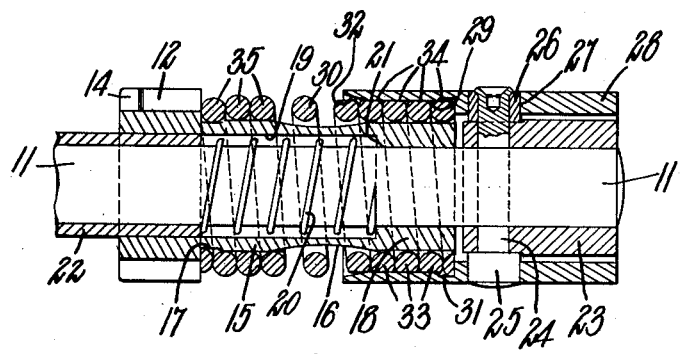
Fig. 2 is a sectional plan view taken on the line 2—2 of Fig. 1.
Figure 3:
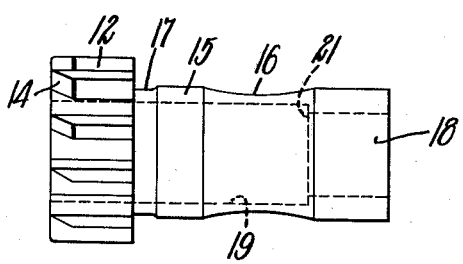
Fig. 3 is a detail side elevation of the pinion or driven member.
Figure 4:
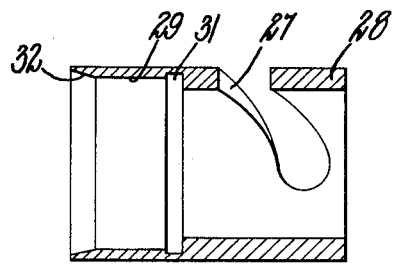
Fig. 4 is a detail longitudinal sectional view of the cam member which constitutes a driving member.
Figure 5:
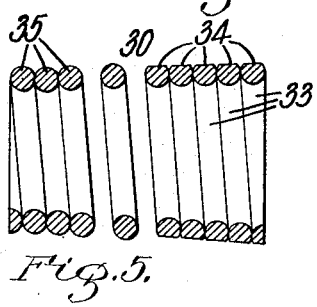
Fig. 5 is a detail longitudinal sectional view of a preferred type of spring which is utilized as it appears before it is attached to the driving and driven members.

When the gear 13 and its crank shaft are rotating and the internal combustion engine has started to fire, the starter mechanism is stopped in the usual well-known manner and the pinion 12 will be moved out of engagement with the gear 13 due to the fact that the pinion 12 will then be rotated by the gear 13, and the pin 24 being stationary the pinion 12, spring 30 and cam member 28 will be forced toward the right, Figs. 1 and 2, by the engagement of the pin 24 with the cam slots 27.

It will be noted that where the torsion spring 30 engages the hub 15 of the pinion 12 that there is a wrapping or self-tightening action around said hub in the direction of the drive and the spring cannot slip upon the hub. It can slip, however, in the other direction. The frictional contact at the end of the spring which is located within the bore 29 of the cam member 28 has a driving capacity at least as much as the stall torque of the starting motor, but in this case the drive tends to release the clutching action of the spring instead of tightening it. Reverse motion would tighten it and lock it so that there would be no slip. It is therefore seen that one end of the spring can slip on an overload in either direction.

Figure 6:
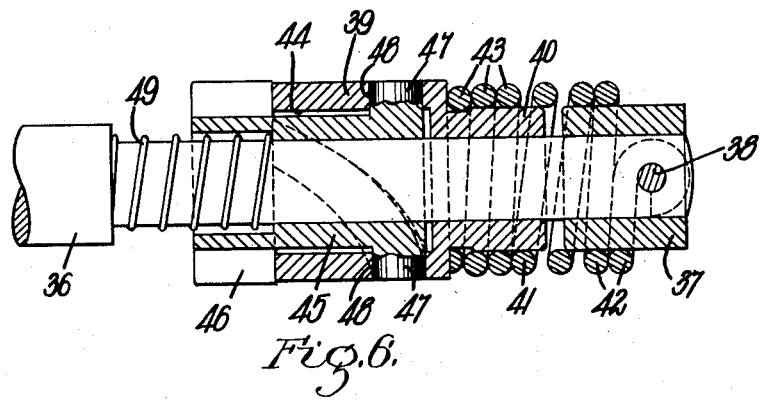
Fig. 6 is a longitudinal sectional elevation of another form of engine drive mechanism embodying my invention.

In Fig. 6 I have illustrated a modified embodiment of my invention in which 36 represents a starting motor shaft, at the end of which is a sleeve 37 which constitutes a driving member and which is secured to the shaft to rotate in unison therewith by means of a pin 38. Loosely mounted upon the shaft 36 to slide longitudinally thereon and also to rotate thereon is a cam member 39 which constitutes a driven member and which has a hub portion 40 embodied therein. A helical torsional shock-absorbing spring 41 is interposed between the driving member 37 and driven member 39. Several of the intermediate convolutions of the spring 41 are spaced apart. Several convolutions 42 at one end of the spring 41 abut one against another and surround the periphery of the driving member 37 and the extremity of the end convolution is positively secured to the pin 38. Several other convolutions 43 at the other end of the spring 41 abut one against another and surround the periphery of the hub portion 40 of the driven member 39 and have expanded frictional engagement with the periphery of said hub. All of the convolutions of the spring 41 are wound right hand.

The cam member 39 has a recess 44 projecting inwardly from one end face thereof and a hub portion 45 of a pinion 46 is located within said recess. Projections 47 project from opposite sides of the periphery of the hub portion 45 into cam slots 48 that are provided in the cam member 39. A small helical spring 49 surrounds the shaft 36 and is interposed between the pinion 46 and a shoulder that is provided upon said shaft.

In this form of my invention the spring 41 acts as a safety clutch between the driving member 37 and driven member 39. When the starter motor shaft 36 is rotated, the rotary motion of the driving member 37 will be transmitted to the driven member 39 through the spring 41 and when the driven or cam member 39 is rotated, the sides of the cam grooves 48 will act upon the projections 47 and force the pinion 46 lonigtudinally upon the shaft 36 toward the left Fig. 6, causing the teeth of said pinion to engage the teeth of a ring gear similar to the gear 13 previously described in connection with the preferred embodiment of this invention. At the same time the cam member 39 will act to cause the pinion 46 to rotate in unison therewith. When the pinion 46 is driven in a reverse direction by the ring gear, the projections 47 will engage the sides of the cam slots in a manner to force the cam member longitudinally upon the shaft toward the right Fig. 6, thereby causing the teeth of the pinion to be disengaged from the teeth of the ring gear.

Figure 7:
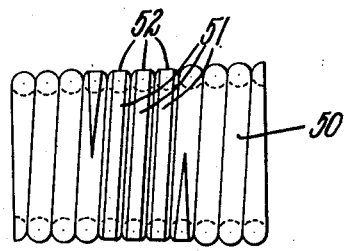
Figs. 7 and 8 are detail views illustrating alternate forms of springs which may be utilized in my engine drive mechanism.

In Fig. 7 I have illustrated an alternate form of spring 50 which may be utilized with the preferred embodiment of this invention. This spring, preferably constructed of round wire, is wound left hand and the convolutions all abut together. Several intermediate convolutions 51 are flattened at 52 in a manner to increase the flexibility of the central portion of the spring without reducing the clutching power of said spring.

Figure 8:
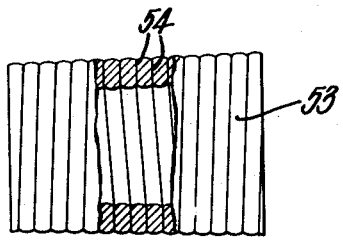

In Fig. 8 I have illustrated another alternate construction of spring 53, the convolutions of which are wound le't hand. This spring is constructed of flat wire and the flattened faces of the convolutions abut together at 54. In this form of spring there are more coils for the length of the spring and there is increased clutching power and greater flexibility.

Although the drawings illustrate the springs 30, 50 and 53 as being of frusto-conical form prior to being assembled, this is non-essential. A cylindrical form of spring can be used with equal efficiency. The requirements are that the hole into which one end of the spring is pressed or contracted must be smaller than the normal outside diameter of the spring, and the hub around which the other end of the spring is pressed or expanded must be larger than the normal inside diameter of the spring.

Figure 9:
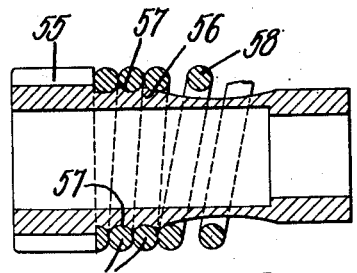
Fig. 9 is a detail longitudinal sectional view illustrating another method of attaching a spring to a pinion.

In Fig. 9 I have illustrated a modified construction of pinion 55 which may be substituted for the pinion 12 of the preferred construction. This pinion has a hub portion 56 embodied therein which has a helical groove 57 extending around its periphery. A helical torsion spring 58 wound right hand surrounds the hub 56 and a plurality of end convolutions 59 are secured to said hub within said helical groove and have expanded frictional engagement therewith. The other end of the spring will have contracted frictional engagement with the interior of the driving member 28 in the same manner as does the spring 30.

In connection with this invention it must be borne in mind that electric motors of the type used for starting engines accelerate so rapidly during the engaging process that the shock torque is twice that of the stall torque. When the engine backfires, the torque set-up is about five times that of the stall torque of the electric motor, so that any spring successfully resisting these overloads would be too rigid to effect quiet engagement of the gears and prevent damage to the gear teeth.

The torsional spring utilized in the devices of this invention are sufficiently flexible to offer the least possible resistance to the engagement of the gears as they are not called upon to resist a load as great as the shock torque of the electric motor owing to the action of the friction clutch. The clutch is designed to give way to the shock torque and excessive loads set up by backfiring of the engine.

In a device of this type the clutch, to be of any practical value, must have a constant friction or torque capacity. The slipping point must remain unchanged with varying degrees of lubrication. In all the well-known types of discs and cone clutches, the coefficient of friction varies more than 100% with different degrees of lubrication, so that they cannot be successfully used for this purpose. The present type of radially acting clutch, which is preloaded to the desired amount or degree, does not vary over 10% with any lubrication because the clutching surfaces are always in contact and the space between the coils of the spring clutch allows oil to be present without affecting the clutching action.

During the operation of the various embodiments of this invention when the electric motor is energized, the assembly, comprising the pinion, torsion spring and cam member, advances along the shaft toward the large gear and forms a unit comprising the inertia unit of relatively great weight. If the pinion strikes the end of the teeth of the large gear, the spring will yield endwise and allow the pinion teeth to make an easy entrance. The pinion then continues to advance to the end of its forward motion. By this time the electric motor has reached a relatively high speed and then the center coils of the torsion spring wind up, offering a torsional resistance to the electric motor. This action is limited by the hub of the pinion on which the center coils stop. At this point the spring ceases to function as such, and then the slipping or clutch action takes place at the rear end of the spring. On every start the clutch will slip from 30 to 60 degrees and in this way the shock torque is dissipated in friction without subjecting any of the mechanism to any excess load, which would otherwise cause damage.

When backfiring takes place further slipping will result, but in any case the mechanism is protected from all loads beyond the predetermined capacity of the clutch.

When the engine starts under its own power, the mechanism automatically returns to its normal position. Here again the endwise yielding of the spring softens the impact and prevents the pinion from recoiling to clash with the large gear.

Extended tests have been made with the slipping clutch mechanism of this invention and it has been determined that the shock is reduced to 25% of that of a torsion spring which does not have a slipping action, and the life of the entire mechanism including the ring gear upon the flywheel is increased at least 400%.

I claim:

1. An engine starter comprising a motor, a rotatable shaft driven thereby, a driving member operatively connected to said shaft to rotate therewith, a driven member spaced apart from said driving member, and a coil spring interposed between said driving and driven members and forming a friction clutch and axial and radial shock absorbing connection therebetween, for the purpose of preventing tooth chipping.

2. An engine starter comprising a motor, a rotatable shaft driven thereby, a driving member operatively connected to said shaft to rotate therewith, a driven member, and a spring comprising a frictional driving connection of predetermined gripping capacity interposed between said driving and driven members and frictionally connected upon its exterior to one of said members, and upon its interior to the other of said members, whereby said spring will slip on overloads in the direction of driving.

3. An engine starter comprising a motor, a rotatable shaft driven thereby, a driving member operatively connected to said shaft to rotate therewith, a driven member, and a coil spring interposed between said driving and driven members and frictionally engaged with one of said members to slip at each start of the motor, the degree of said frictional engagement being predetermined to permit slippage under shock torque and backfire torque conditions.

4. An engine starter comprising a motor, a rotatable shaft driven thereby, a driving member operatively connected to said shaft to rotate therewith, a driven member loosely mounted upon said shaft, and a yielding and slipping driving connection comprising a torsion spring interposed between said driving and driven members and frictionally connected at one end thereof upon its exterior to one of said members, and at the other end thereof upon its interior to the other of said members, the degree of said frictional engagement being such as to permit a slippage at not less than stall torque conditions.

5. An engine starter comprising a motor, a rotatable shaft driven thereby, a driving member operatively connected to said shaft to rotate therewith, a driven member loosely mounted upon the shaft, and a helical torsion and compression spring embodying therein permanently spaced apart coils interposed between said driving and driven members and frictionally connected at one end thereof upon its exterior to one of said members, and at the other end thereof upon its interior to the other of said members, and forming a friction clutch, said spring also forming an axial and radial shock-absorbing driving connection between the members.

6. An engine starter comprising a motor, a rotatable shaft driven thereby, a driving member operatively connected to said shaft to rotate therewith, a driven member mounted to travel longitudinally on said shaft and also to rotate therewith or thereon, and a helical torsion and compression spring interposed between said driving and driven members and having expanded and contracted frictional rotary driving engagement therewith, said spring also being adapted to yield axially and radially to prevent tooth chipping on a tooth butt and to slip in a forward running direction at every start of the motor to dissipate shocks.

7. An engine starter comprising a motor, a rotatable shaft driven thereby, a driving member operatively connected to said shaft to rotate therewith, a pinion mounted to travel longitudinally on said shaft and also to rotate therewith or thereon, and a helical torsion and compression spring interposed between said driving member and pinion and having expanded and contracted frictional rotary driving engagement therewith, a portion of the coils of said spring being permanently spaced apart to prevent contact one with another on a tooth butt and to function as an axial and radial shock absorber, said spring being adapted to slip a portion of a rotation at every start of the motor.

8. An engine starter comprising a motor, a rotatable shaft driven thereby, a pinion mounted to travel longitudinally on said shaft and also to rotate therewith or thereon, said pinion having a hub portion embodied therein, a cam member encircling said shaft provided with an internal bore, a helical torsion and compression spring interposed between said cam member and pinion, and frictionally connected to the hub of said pinion and to said cam member within said internal bore, a portion of the coils of said spring being permanently spaced apart to prevent tooth chipping, and said spring also being adapted to slip on overloads in the direction of driving, and means on the shaft to actuate the cam member whereby the latter may be moved longitudinally of the shaft and the longitudinal movement imparted to the driven member through the spring.

9. An engine starter comprising a motor, a rotatable shaft driven thereby, a pinion mounted to travel longitudinally on said shaft and also to rotate therewith or thereon, said pinion having a hub portion embodied therein and being provided with a chamber therein surrounding said shaft, a cam member encircling said shaft provided with an internal bore, a helical torsion spring interposed between said cam member and pinion and frictionally connected to the hub of said pinion and to said cam member within said internal bore, a portion of the coils of said spring being spaced apart, said coils having resistance of sufficient degree to prevent complete closing of the space between said coils on a booth butt, means on the shaft to actuate the cam member whereby the latter may be moved longitudinally of the shaft and the longitudinal movement imparted to the driven member through the spring, a sleeve surrounding the shaft and projecting into the chamber of the pinion and supporting an end of the latter, and a spring surrounding the shaft within the chamber, one end of said last-named spring abutting against the sleeve and the other end abutting against the end wall of the chamber.

10. An engine starter comprising a motor, a rotatable shaft driven thereby, a driving member operatively connected to said shaft to rotate therewith, a driven member loosely mounted upon said shaft and spaced apart from said driving member to permit a relative axial movement between said members, and a coil spring interposed between said driving and driven members and forming a friction clutch on one of said members to slip at each start of the motor, said spring being adapted to slip on a load exceeding the torque of the motor.

11. An engine starter comprising a motor, a rotatable shaft driven thereby, a driving member operatively connected to said shaft to rotate therewith, a driven member loosely mounted upon said shaft, and a coil spring interposed between said driving and driven members, and having contracted frictional engagement at one end thereof with one of said members, and expanded frictional engagement at the other end thereof with the other of said members, said spring being adapted to slip on one of the members at every start of the motor and also on all overloads that exceed the torque of the motor.

12. An engine starter comprising a motor, a rotatable shaft driven thereby, a driving member operatively connected to said shaft to rotate therewith, a driven member loosely mounted upon said shaft, and a coil spring driving connection interposed between said driving and driven members and frictionally connected to one of said members to slip at every start of the motor, said spring also yieldingly holding the driving and driven members spaced apart, whereby the driven member will yield on a tooth butt and thereby prevent tooth chipping.

13. An engine starter comprising a motor, a rotatable shaft driven thereby, a driving member operatively connected to said shaft to rotate therewith, said member having a groove formed thereon, a driven member loosely mounted upon the shaft and spaced apart from the driving member and also having a groove formed thereon, and a helical torsion and compression spring interposed between said driving and driven members and having frictional rotary driving engagement of predetermined capacity therewith to permit slippage only at a point approximating the torque of the motor, the end coils of said spring being expanded and contracted into said grooves whereby axial movement of said end coils upon the driving and driven members is prevented.

14. An engine starter comprising a motor, a rotatable shaft driven thereby, a driven member mounted to travel longitudinally on said shaft and also to rotate therewith or thereon, a cam member encircling said shaft, a spring interposed between said cam member and driven member and frictionally engaged with one of said members, the degree of said frictional engagement being predetermined to permit slippage at every start of the motor and under stall torque conditions, and a lateral projection on the shaft engaging the cam member and adapted to actuate the latter to impart a longitudinal movement of the driven member through the spring.

15. An engine starter comprising a motor, a rotatable shaft driven thereby, a driven member mounted to travel longitudinally on said shaft and also to rotate therewith or thereon, said driven member being separated from said driving member to permit a relative axial movement therebetween, a cam member encircling said shaft, a coil spring interposed between said cam member and driven member and frictionally engaged with one of said members, the degree of frictional engagement being such as to permit slippage at every start of the motor and at approximately the torque of the motor, certain of the coils of said spring being permanently spaced one from another to function as an axial shock absorber, and a trunnion member fast to the shaft and engaging the cam member and adapted to actuate the latter to impart a longitudinal movement to the driven member through the spring.

16. An engine starter comprising a motor, a rotatable shaft driven thereby, a driven member mounted to travel longitudinally on said shaft and also to rotate therewith or thereon, a cam member encircling said shaft and provided with a cam slot therein, a compression spring interposed between said cam member and driven member and frictionally connected at one end thereof upon its exterior to said cam member, and at the other end thereof upon its interior to said driven member, said spring being adapted to yield axially and also to slip on overloads in the direction of driving thereby absorbing shocks and preventing tooth chipping, and a lateral projection on said shaft projecting into said cam slot and adapted to actuate the cam member to impart a longitudinal movement to the driven member through the spring.

17. An engine starter comprising a motor, a rotatable shaft driven thereby, a driving member operatively connected to said shaft to rotate therewith, said member having an annular groove formed thereon, a pinion mounted to travel longitudinally on said shaft and also to rotate therewith or thereon, said pinion having an annular groove formed thereon, and a coil spring interposed between said driving member and pinion and having expanded and contracted frictional rotary driving engagement therewith and the end coils of said spring being adapted to spring into said annular grooves and prevent axial movement of said end coils upon the driving member and pinion.

18. An engine starter comprising a motor, a rotatable shaft driven thereby, a driving member operatively connected to said shaft to rotate therewith, a driven member, and a coil spring interposed between said driving and driven members and forming a friction clutch of constant torque capacity substantially equal to the torque of the motor and adapted to slip at every start of the motor.

ROLLIN ABELL.